United States Patent
De Angel et al.

(10) Patent No.: US 6,950,840 B2
(45) Date of Patent: Sep. 27, 2005

(54) NOISE INVARIANT CIRCUITS, SYSTEMS AND METHODS

(75) Inventors: Edwin De Angel, Austin, TX (US); Eric J. Swanson, Buda, TX (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 10/832,141

(22) Filed: Apr. 26, 2004

(65) Prior Publication Data

US 2004/0199563 A1 Oct. 7, 2004

Related U.S. Application Data

(62) Division of application No. 09/840,530, filed on Apr. 23, 2001.

(51) Int. Cl.[7] ................................................ G06F 7/52
(52) U.S. Cl. ........................ 708/200; 707/620; 707/628
(58) Field of Search ................................ 708/200, 620, 708/625, 626, 628, 629, 630, 631; 713/320, 324

(56) References Cited

U.S. PATENT DOCUMENTS

| | | | | |
|---|---|---|---|---|
| 5,200,912 A | * | 4/1993 | Asghar et al. | 713/321 |
| 5,677,849 A | * | 10/1997 | Smith | 713/300 |
| 5,787,029 A | * | 7/1998 | de Angel | 708/628 |
| 6,065,032 A | * | 5/2000 | Nicol | 708/628 |
| 6,604,120 B1 | * | 8/2003 | De Angel | 708/631 |

* cited by examiner

Primary Examiner—Chuong D Ngo
(74) Attorney, Agent, or Firm—Steven Lin, Esq.

(57) ABSTRACT

The electrical circuitry for a multiplier system includes a counter for determining proximity to sampling operation, and a switch to select between symmetrical noise invariant operation and a low-power mode of operation. A noise invariant circuit disables row skip operation in a multi-row multiplier, to enable analog sampling. Disabling of the row skip operation is accomplished at a time which is several digital cycles preceding the time of analog sampling. Power saving multiplier row skippage resumes after analog sampling is completed.

7 Claims, 6 Drawing Sheets

MULTIPLY CELL BLOCK DIAGRAM

NOISE INVARIANT CIRCUITS, SYSTEMS AND METHODS

This application is a divisional application of U.S. Ser. No. 09/840,530 filed Apr. 23, 2001 entitled "Noise Invariance Circuits, Systems and Methods (As Amended)" and having inventors Edwin De Angel and Eric J. Swanson.

BACKGROUND OF THE INVENTION

1. Field of the Invention

This invention relates to analog and digital circuitry and methods, and more particularly to noise-invariant circuits, systems, and methods.

2. Description of the Related Art

U.S. Pat. No. 5,787,029 granted on Jul. 28, 1998 to Edwin de Angel, discloses an ultra low power digital multiplier which uses a modified Booth algorithm to dissipate power proportional to the magnitude of a particular operand, with logic races being eliminated by use of iterative networks. Multipliers are employed in digital filters, digital signal processors (DSP's), and floating point processors, as well as in other complex electrical and electronic systems. One application for such multipliers is in seismic DSP's fir gathering seismic information at selected sensor locations. Such multipliers have a plurality of multiplier rows and activation of particular rows is selectively suppressed to conserve power. Each multiplier row comprises a plurality of blocks of computational logic circuitry. Each block provides a data valid signal to an adjacent block, to enable further processing. The Booth multiplier operates by generating successive partial products from first and second multiplicands comprising overlapping bit groups including a sign bit. According to one construction, a multiplier includes a top row having a plurality of encoders/multiplexers B. A next row includes a plurality of multiplier cells. The multiplier further includes a carry propagate adder having multiplexers, ECDL full adders, and ECDL half adders. The adders and multiplexers have sum and carry outputs, S and C. A NOOP is defined as a triplet 000 or 111, resulting in a zero value addition and not requiring a multiplier row to be turned on. To save power, particular NOOP rows are not turned on, because their being turned on would result in addition of a zero value to the next row while their not being turned on would have the same result. In one multiplier arrangement, a multiplier bus is connected to decoders/multiplexers and multicell circuits. The bus is divided into triplets which are encoded by plural encoders associated with respective multiplier rows. A NOOP signal is passed on particular busses to first row decoders/multiplexers and other row multicell circuits, to indicate particular row skippage. F1 and F2 outputs are provided as to least significant bit content from the decoders/multiplexers to selected least significant multicell circuits. Each row except the first row is provided with switches for receipt of done or start switches, and each row is configured to provide an enable signal to a next in order row at the enable input of one of the two multicell circuits on one end or the other of each row. Upon receipt of an enable signal, each of the multicells activates its adder and then generates a done signal at a done output which in turn activates a next adder, or then signals to the switch in the next row that the present row is finished, or passes an enable signal through an AND gate which is passed to a carry propagate adder. Each of the switches is controlled by a NOOP signal on its associated bus. If the encoded triplet of the received signal is other than a NOOP signal, i.e.; a 000 or a 111 code, then the receiving switch signals its receiving row to begin the addition process for that row. If the encoded triplet is 000 or 111, then the enable signal to that row is suppressed by the associated switch and an enable signal is passed to a next in order switch or an AND gate in the case of a last row. When the enable signal is suppressed, the applicable row does not calculate its sums and carrys. Since this data is not available to the next row, each of the multicell circuits also passes the sums and carries from the prior row and makes it available to the next row. Each of the multicell circuits needs to know whether the prior row was a NOOP or a normal operative evolution. This is accomplished with NOOPpast and NOOPpastbar signals.

Unfortunately, the reduced level of power dissipation results in a higher noise level which interferes with quality signal detection and interpretation in connection with sampling operation.

There is a further need for low power operation of in analog and digital subsystems which operate at reduced noise levels in the proximity of sampling operation.

SUMMARY OF THE INVENTION

According to one embodiment of the present invention, a selectively low power, self-timed multiplier system includes counter circuitry for determining proximity to analog sampling operation, and a switch to select between symmetrical noise invariant operation and a low-power mode of operation. In particular, an ultra-low power multiplier according to the present invention includes a switch for controlling row enablement and disablement to alternate between power saving and noise reduction modes as a mixed signal circuit enters and departs from sensing operation. More particularly, a selectably low power, self-timed multiplier circuit employs dual rail logical operations in which a logical one is encoded as 01 and a logical zero is encoded as 10. To switch from a logical one to a logical zero, or from a logical zero to a logical one, an intervening reset state of 00 is entered. The selectably low power, self-timed multiplier system according to the present invention operates with symmetrical first and second transitions originating from a 01 or 10 state and ending with a 00 state at completion of each analog evaluation under noise invariant conditions. Thus, during persistent digital operation, a condition of noise invariance is maintained as the switching activities for the selectably low power, self-time multiplier system are substantially the same for each cycle of operation. For low power digital operation remote from analog evaluation, row bypass operation is permitted to occur, resulting in asymmetrical operation in a relatively noisier environment. Such asymmetrical, relatively noisy operation of the selectably low power, self-timed multiplier system in a power saving mode continues on successive digital clock events as a critical analog edge approaches. Once the critical analog edge is sufficiently close, digital activities are turned off to provide a power ground recovery time of predetermined length. Additionally, the selectably low power, self-timed multiplier system is noise invariant in the proximity of analog sensing operation by ensuring that substantially similar, essentially symmetrical switching operations are maintained in successive operative cycles preceding and after analog sensing operation. The selectably low power, self-timed multiplier system according to the present invention toggles between power saving and reduced noise modes of operation. Operation is implemented with a row_enable (L) output line and a bypass_out output line respectively driven by a NOR output gate and a NAND output gate. The NOR gate is in turn driven by first and second NOR input gates, and the NAND output gate is driven by a NAND input gate and an IP_ROW_NOOP input signal. The NAND input gate is further driven by a BYPASS_IN signal line and a ROW_DONE signal line. The first NOR input gate is driven by the IP_ROW_NOOP signal line and the BYPASS_IN signal line, and the second NOR input gate is driven by the IP_ROW_NOOP signal line and the ROW_DONE signal line. When the IP_ROW_NOOP signal line goes high, it causes ROW_ENABLE to go high and BYPASS_OUT to go low after BYPASS_IN arrives during a power saving mode according to the present invention. During a noisy mode according to the present invention, the full adders remain on to maintain noise generated at a constant level.

DETAILED DESCRIPTION OF THE PREFERRED EMBODIMENTS

Figure 1:
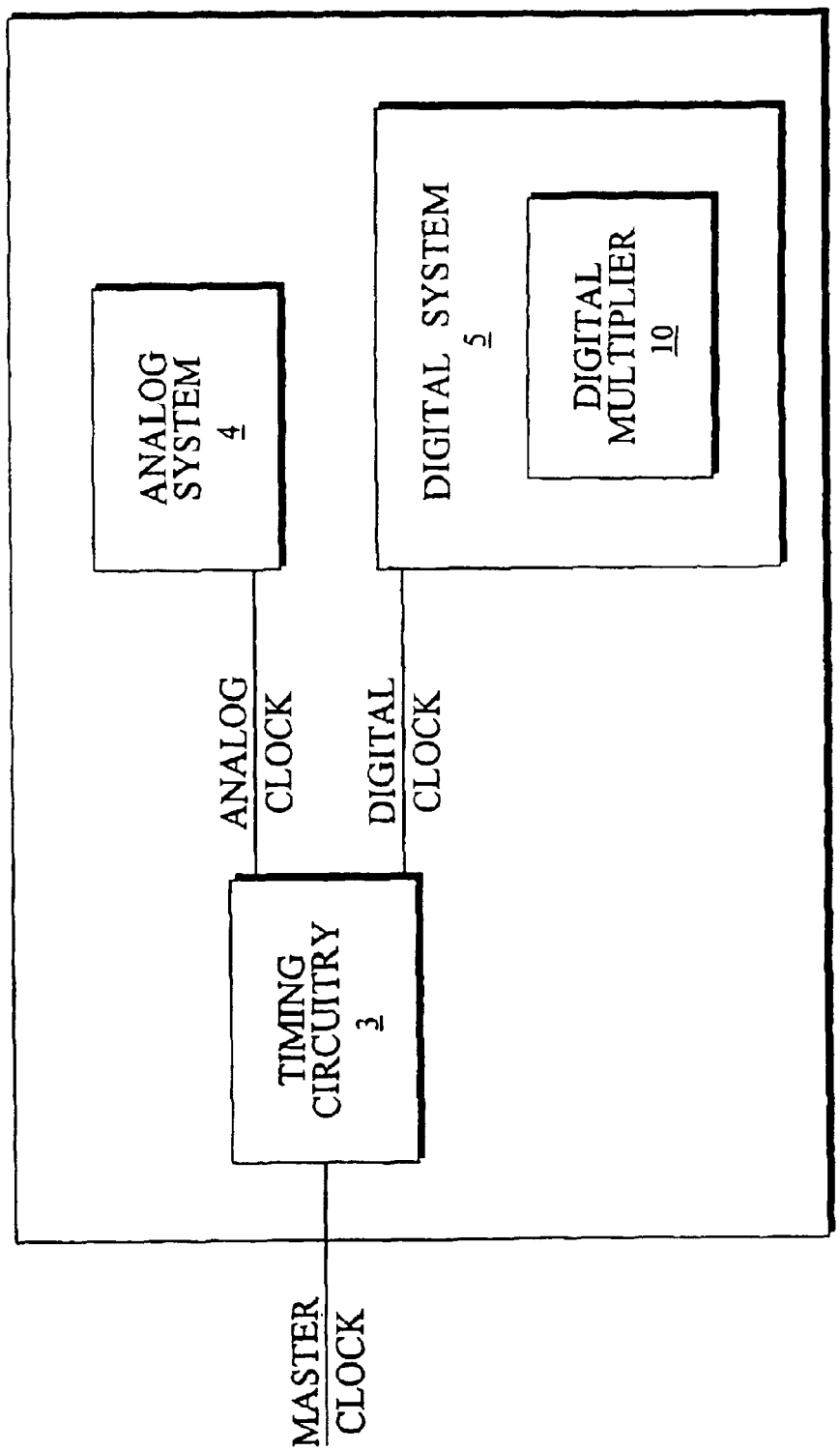
FIG. 1 is a block diagram of a semiconductor chip system including timing circuitry, an analog system, and a digital system in turn including digital multiplier, according to the present invention.

FIG. 1 is a block diagram of a semiconductor chip system 2 including timing circuitry, an analog system 4, and a digital system 5 in turn including a digital multiplier 10, according to the present invention. The operation of the semiconductor chip system 2 is governed by a master clock (not shown) which produces a master clock signal which is provided to timing circuitry 3 configured to produce an analog clock signal and a digital clock signal, which are provided from timing circuitry 3 respectively to analog system 4 and digital system 5, to enable their coordinated operation according to well-known electric circuit principles. The various master, analog, and digital clock signals are described below in greater detail with reference to FIG. 4.

Figure 2:
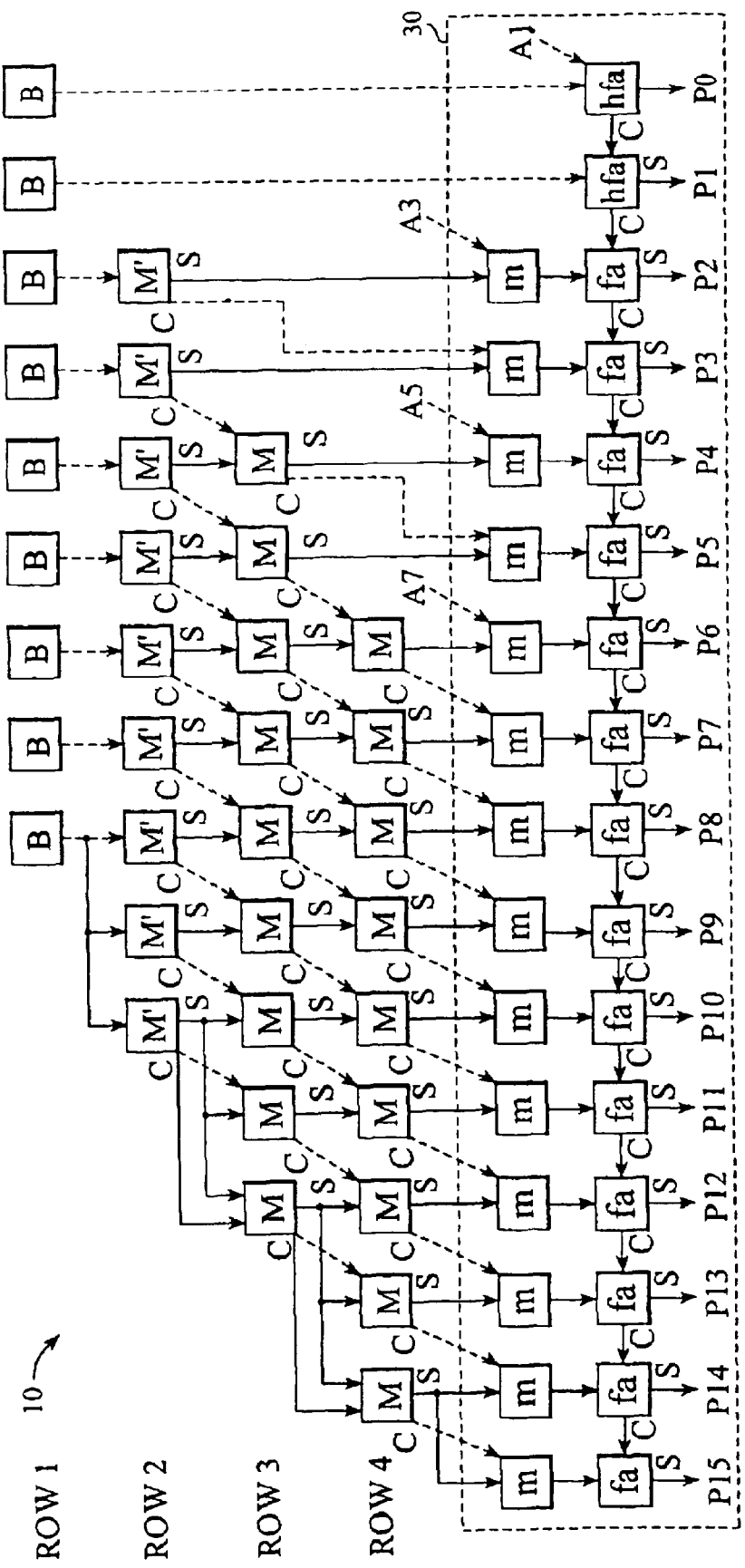
FIG. 2 is a block diagram of a digital multiplier for use in connection with the present invention.

FIG. 2 is a block diagram of a digital multiplier 10 for use in connection with the present invention. In particular, the Figure shows an eight bit by eight bit digital multiplier having a plurality of rows. The top row includes nine Booth encoders/multiplexers The second row includes nine multiplier cells with half adders. The next two rows respectively each have nine multiplier cells, M' and M. A carry propagate adder 30 includes 14 8–4 multiplexers, m; 14 ECDL full adders, fa; and two EDCL half adders, hfa. Each of the multipliers M and M' and each of the adders fa and hfa provide a sum output S and a carry output C. The outputs of adders fa and hfa provide output bits p0–p15 of multiplier 10.

Figure 3:
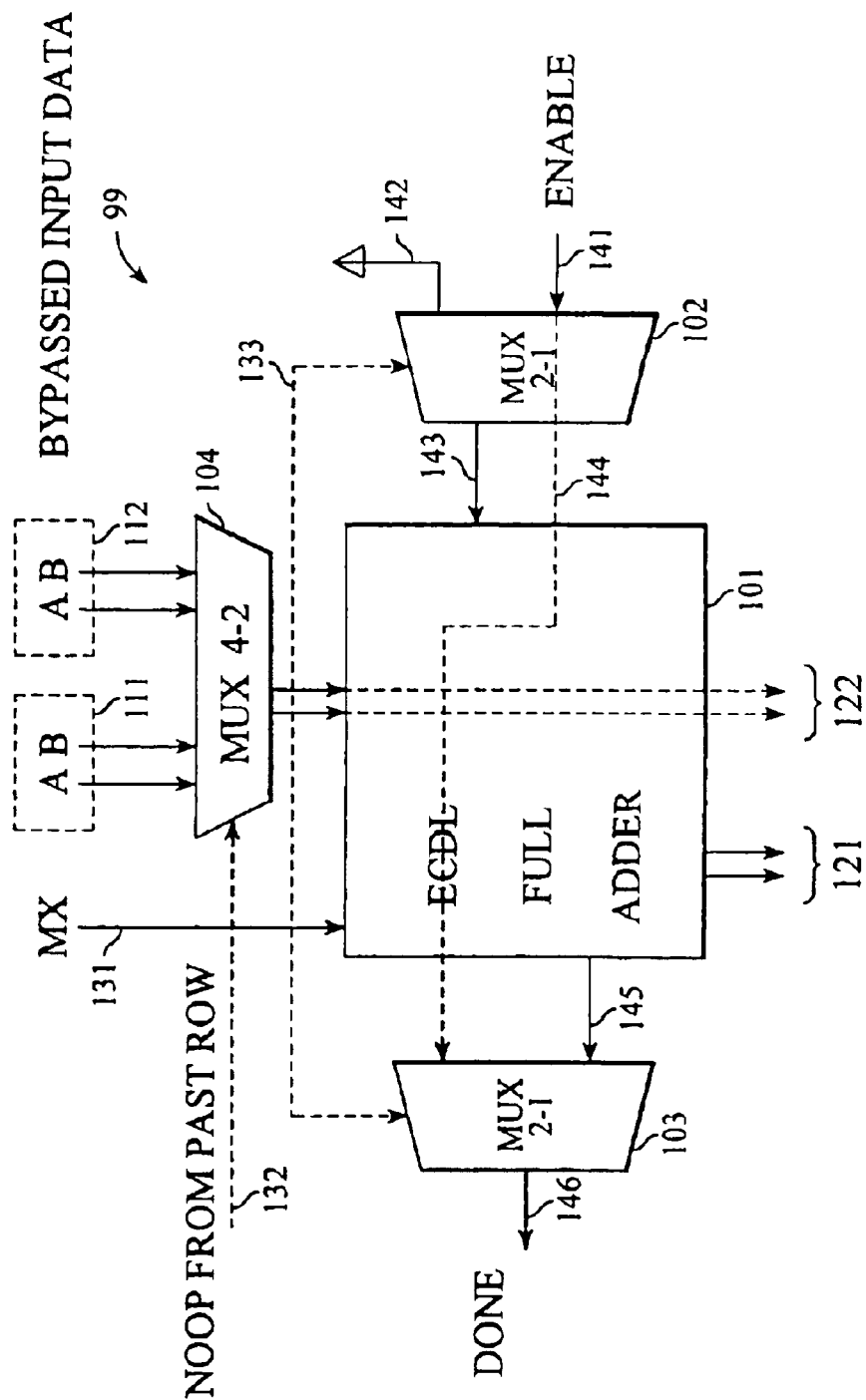
FIG. 3 is a diagram of a multiply cell block system for a multiplier according to the present invention including an ECDL full adder system; first, second, and third multiplexers; and first and second bypassed input data sources (BDS)

As shown in FIG. 3, a multiply cell block system 99 of a multiplier 10 according to the present invention includes an ECDL full adder system 101; first, second, and third multiplexers respectively 102–104; and first and second bypassed input data sources (BDS) respectively 111 and 112. According to one embodiment of the present invention, the first BDS 111 is an ECDL full adder corresponding to ECDL full adder system 101 and resident in an immediately prior row of the multiplier 10, and the second BDS 112 is an ECDL full adder corresponding to ECDL full adder system 101 and resident in a row of the multiplier 10 which precedes the immediately prior row of the multiplier. Multiplexers 102 and 103 are each in receipt of first and second input signal of which one is selected for production at the output the applicable one of the multiplexers. The first and second bypassed input data sources 111, 112 are connectable to ECDL full adder system 101 through multiplexer 104. Multiplexer 104 is in receipt of four signals and produces an output of two signals only, by selection of first and second signals from one of first and second bypassed input data sources 111, 112. When multiplexer 104 receives an appropriate NOOP signal from the prior (i.e., the past) row indicating that it has been skipped in the course of multiplication operation, then multiplexer 104 will engage second BDS 112 to ECDL full adder system 101 for addition operation as well as providing the multiplexer output data to a next multiplier row on signal lines 122. The output of ECDL full adder system 101 is additionally provided to a next multiplier row on signal lines 121. ECDL full adder system 101 is further provided with a control input MX on line 131. Similarly, multiplexers 102 and 103 are provided with a control signal on line 133 which enables multiplexers 102 and 103 to provide sidewards row enable and done signals to adjacent ECDL full adder systems in the same row.

Figure 4:
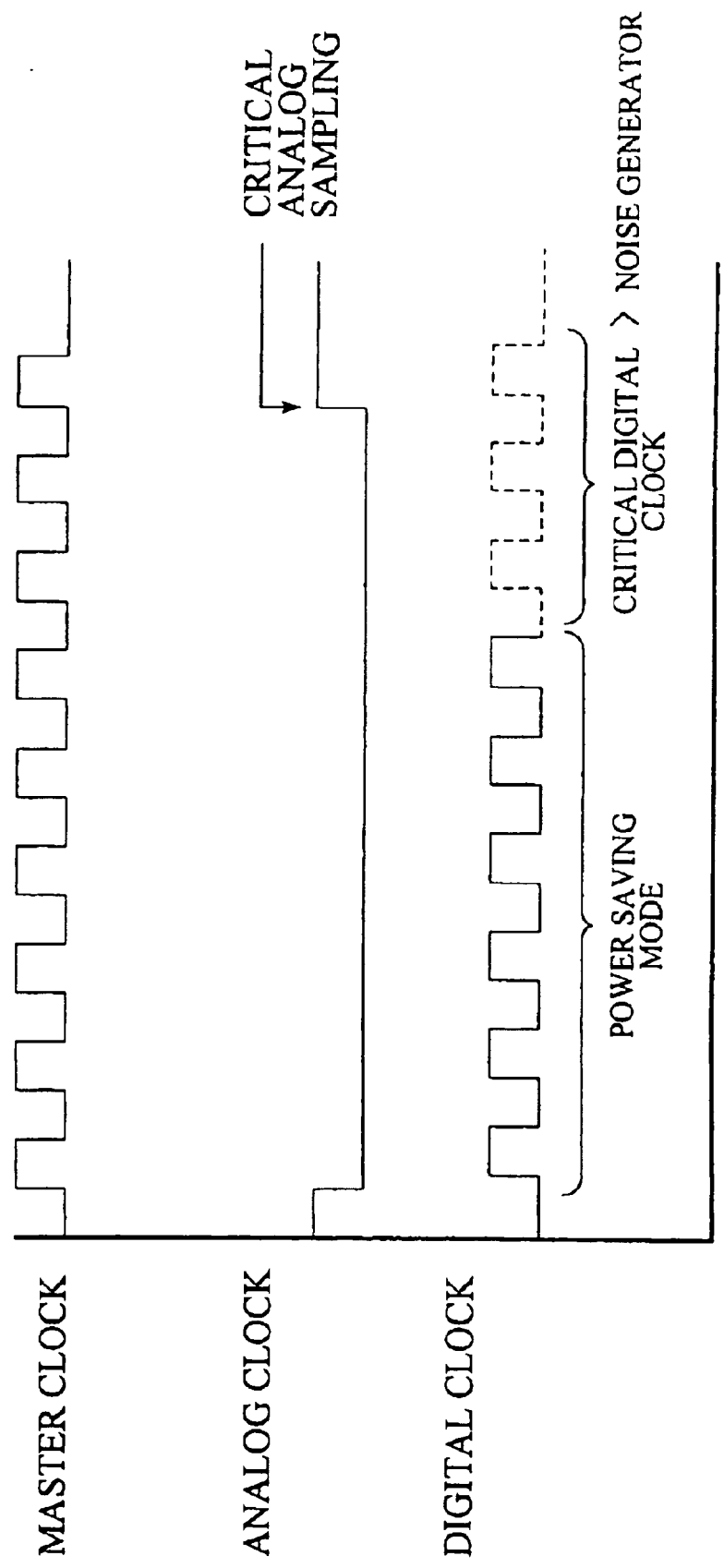
FIG. 4 is a diagram of the relationship between clock signals propagating into and from timing circuitry 3 in semiconductor chip circuitry 2 for driving the analog system 4 and digital system 5 which are embedded in the semiconductor chip circuitry 2. Analog system 4 engages in sampling operations which are optimally undisturbed in a reduced noise environment.

FIG. 4 is a diagram of the relationship between clock signals propagating into and from timing circuitry 3 in semiconductor chip circuitry 2 for driving the analog system 4 and digital system 5 which are embedded in the semiconductor chip circuitry 2. Analog system 4 engages in sampling operations which are optimally undisturbed in a reduced noise environment. FIG. 4 particularly shows a master clock signal stream having the same clock pattern as the digital clock signal stream. As shown, the digital clock waveform lags the master clock waveform by a delay amount. The analog waveform indicates a rising edge which defines the event of analog sampling. A counter of digital clock pulses is used according to the present invention to determine a power saving mode during which asymmetric, relatively noisy, but substantially reduced in power consumption, can be undertaken. However, during critical digital clock period precedent to and succeeding the event of analog sampling, the noise level is diminished by asserting a less power conservative mode of multiplier operation in, which noisy operation due to asymmetric operation is halted. During noisy mode, the full adder is on.

Figure 5:
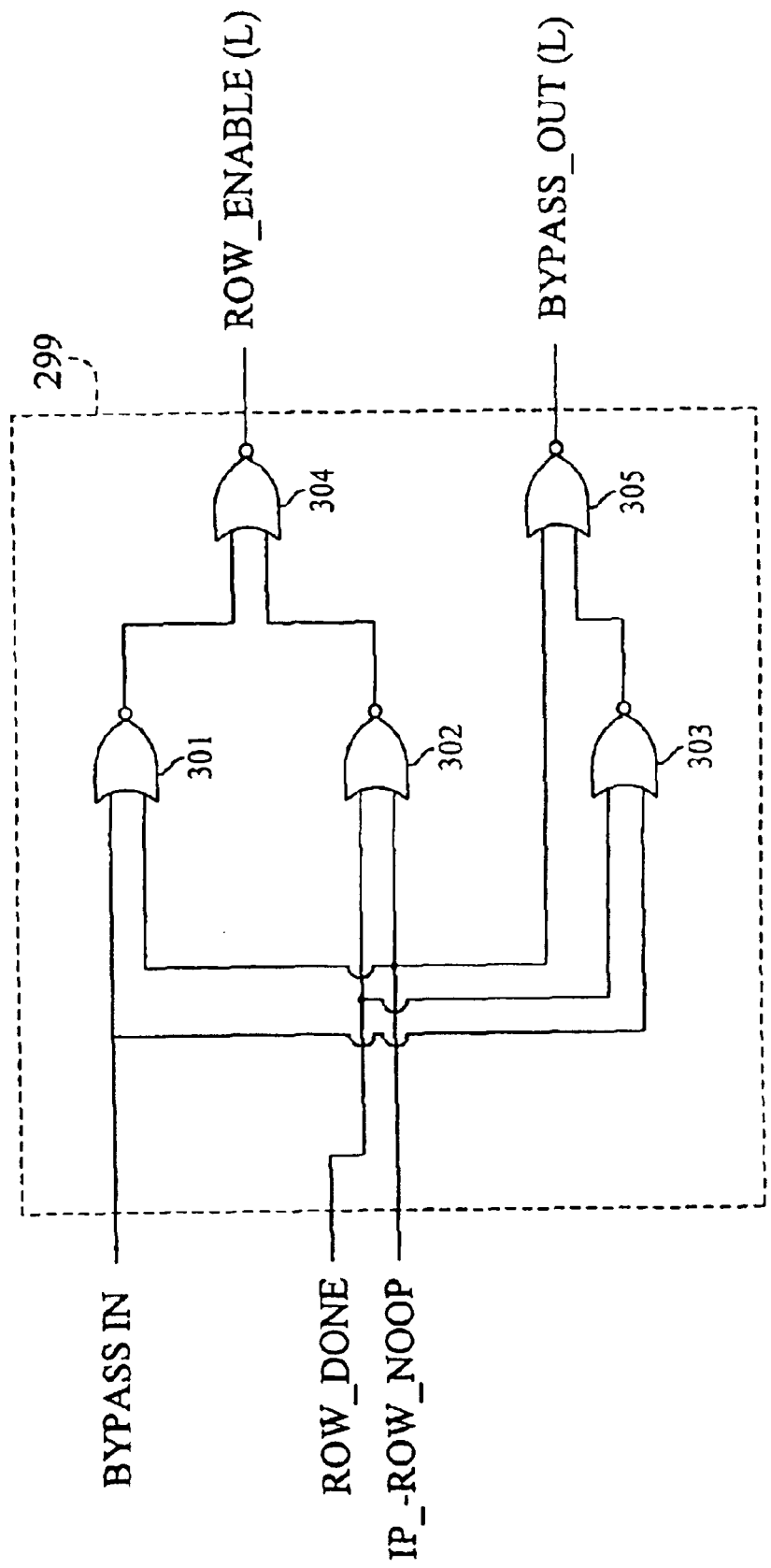
FIG. 5 is a circuit diagram of a switch according to the prior art, according to which ROW_ENABLE(L) and BYPASS_OUT (L) signals are generated in response to BYPASS_IN, ROW_DONE, and IP_ROW_NOOP signals, to permit skippage of rows to enable asymmetric operation which creates a higher noise level, but results in power savings.

FIG. 5 is a circuit diagram of a switch 299 according to the prior art, according to which ROW_ENABLE(L) and BYPASS_OUT(L) signals are generated in response to BYPASS_IN, ROW_DONE, and IP_ROW_NOOP signals, to permit skippage of rows to enable asymmetric operation which creates a higher noise level, but results in power savings. In particular, switch 299 includes NOR gates 301–305, with the BYPASS_IN signal serving as input to NOR gates 301 and. 303. The signal ROW_DONE is input to NOR gates 302 and 303. The signal IP_ROW_NOOP is input to each of NOR gates 301–303. The inputs for NOR gate 304 are the outputs of NOR gates 301 and 302. The inputs for NOR gate 305 are the outputs of NOR gates 302 and 303.

Figure 6:
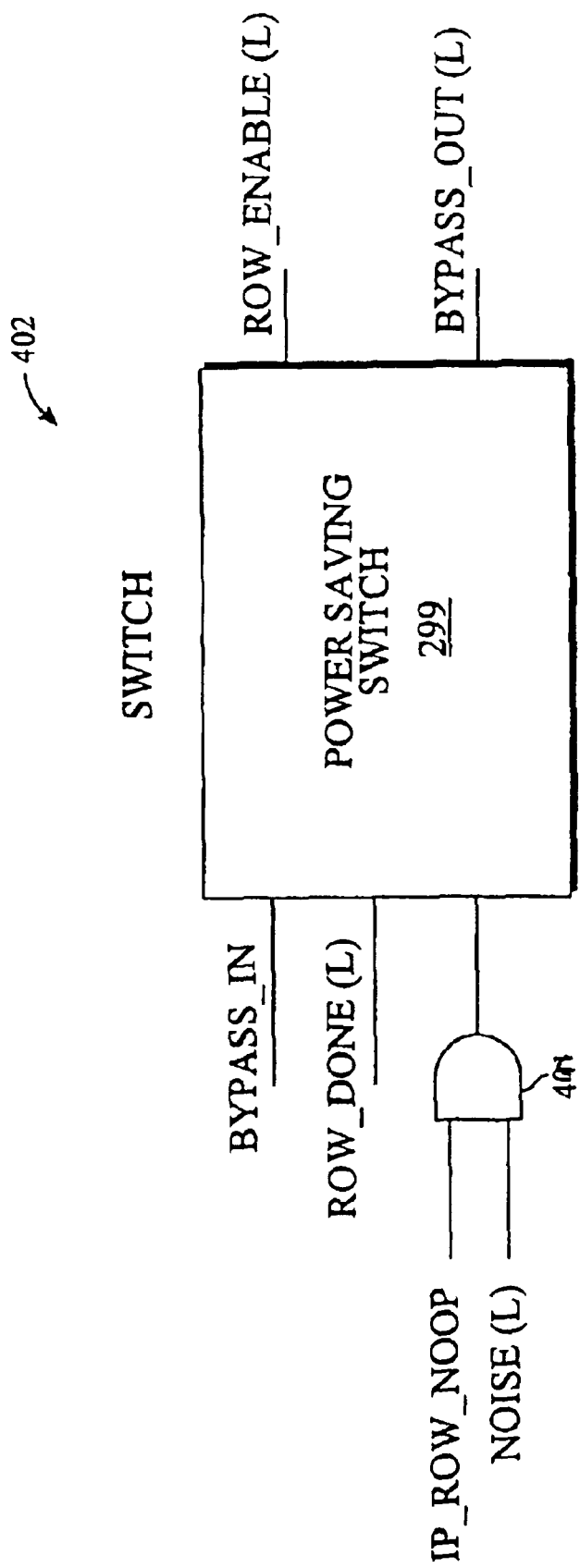
FIG. 6 is a block diagram of a power saving switch system according to the present invention, which includes power saving switch of the prior art receiving as input signals BYPASS_IN and ROW_DONE (L).

FIG. 6 is a block diagram of a power saving switch system 402 according to the present invention, which includes power saving switch 299 of the prior art receiving as input signals BYPASS_IN and ROW_DONE(L). The power saving switch system 402 further includes AND gate 401 configured to receive IP_ROW_NOOP as well as a NOISE (L) signal. Thus, according to the present invention, a row will not be skipped during a noise prevention period signified by the appropriate logical state of the input signal to AND gate 401 which must be "1" when IP_ROW_NOOP reaches a "1" state, to permit noisy operation which is incompatible with analog sensing operation. Thus, a logical state zero indication will prevent skippage of a particular row, ensuring low noise operation, albeit at a cost of reduced power savings.

What is claimed is:

1. A switch circuit for a multiplier system, said switch circuit configured selectively to activate and deactivate selected digital circuitry during power saving and noise reduction modes of operation, said switch circuit comprising:

a switch for producing first and second output signals including respectively a row enable and a bypass out signal, said switch operating in response to first, second, and third input signals including respectively a bypass in signal, a row done signal, and a composite NOOP and noise signal; and a logic circuit for producing a composite NOOP and noise signal from a row NOOP signal and a noise signal.

2. The switch circuit according to claim 1, wherein said switch includes an output NOR gate to produce a row enable circuit, and a AND gate to produce a bypass out signal.

3. The switch circuit according to claim 2, wherein said switch includes first and second input NOR gates connected to and driving said output NOR gate, said first input NOR gate receiving a bypass in signal and a composite row NOOP and noise signal, and said second input NOR gate receiving a row done signal and a composite row NOOP and noise signal.

4. The switch circuit according to claim 1, wherein said switch includes an input AND gate receiving a bypass in signal and a row done signal, said input NAND gate driving said output AND gate.

5. The switch circuit according to claim 4, wherein said input AND gate receives a composite row NOOP and noise input signal.

6. The switch circuit according to claim 1, wherein said output AND gate receives a bypass in signal and a row done signal.

7. The switch circuit according to claim 1, wherein said logic circuit is a AND gate receiving row NOOP and noise control signals.

* * * * *